May 19, 1970 A. RATCLIFFE 3,512,210
WINDOW MOUNTINGS
Filed Nov. 21, 1967 6 Sheets-Sheet 3

INVENTOR:
ARNOLD RATCLIFFE
BY Norris & Bateman
Attys

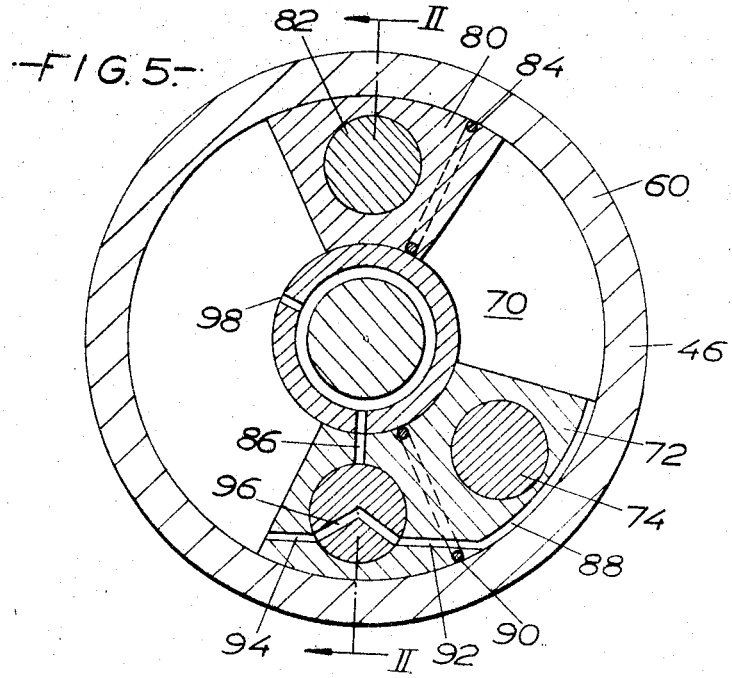
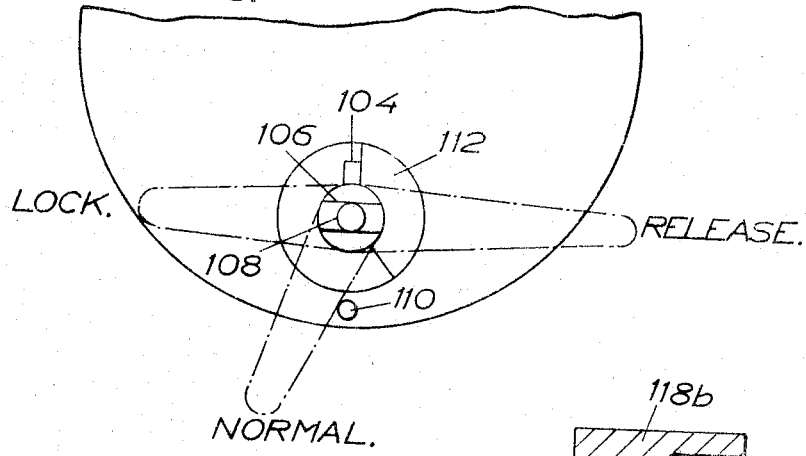
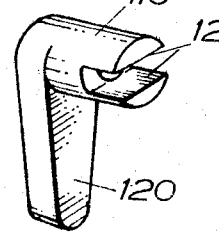
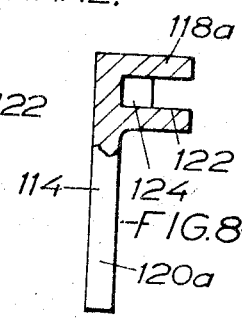
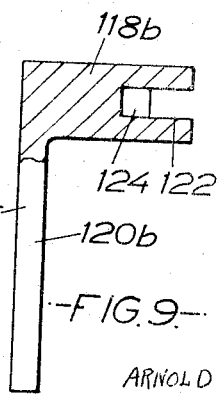
INVENTOR:
ARNOLD RATCLIFFE
BY
Norris + Bateman
Attys INVENTOR:
ARNOLD RATCLIFFE
BY
Norris + Bateman, Atty May 19, 1970     A. RATCLIFFE     3,512,210
WINDOW MOUNTINGS
Filed Nov. 21, 1967     6 Sheets-Sheet 6
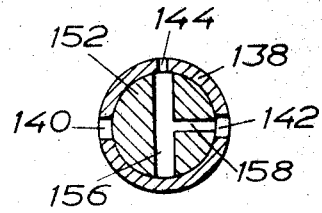
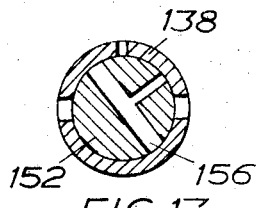
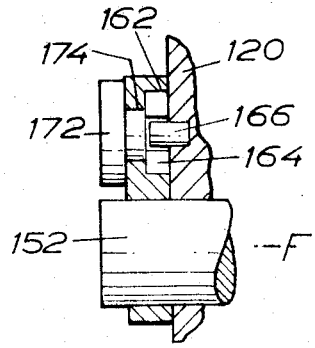
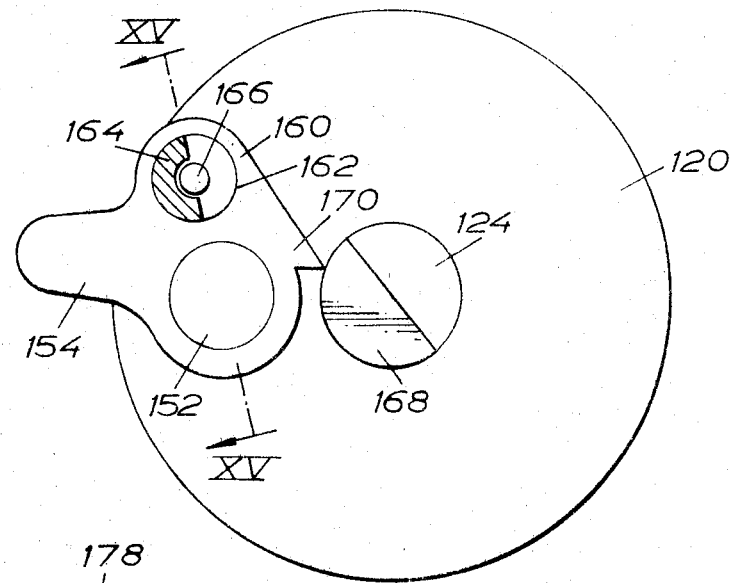
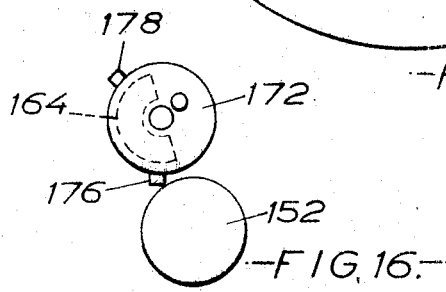
INVENTOR:
ARNOLD RATCLIFFE
BY
Norris + Bateman
Attys United States Patent Office 3,512,210
Patented May 19, 1970

3,512,210
WINDOW MOUNTINGS
Arnold Ratcliffe, 74 Manchester Road, Haslingden,
Rossendale, Lancashire, England
Filed Nov. 21, 1967, Ser. No. 684,757
Claims priority, application Great Britain, Nov. 22, 1966,
52,129/66
Int. Cl. E05d 11/10
U.S. Cl. 16—139                    5 Claims

ABSTRACT OF THE DISCLOSURE

A pivot mounting for a swingable part of a building such as a widow includes a hydraulic damper comprising a housing defining an arcuate chamber subtending at least part of a circle. A vane within the chamber is movable with the swingable part. A partition divides the chamber into two parts one on each side of said vane. A valve is mounted for manually controlled movement within the partition to bring ports in the valve into and out of register with ports in said partition to selectively control flow of hydraulic fluid through said partition from one part of the chamber to the other part for selective pivotal position control and locking of the swingable building part.

---

This invention relates to window and like mountings which will permit a window or the like to be turned over on trunnions so that it is possible to clean the outside of the window from inside the building. Such window mountings are frequently used in modern houses and office blocks and are especially useful in tower blocks of flats and offices.

It is to be understood however, that the invention is not restricted to windows, but could be applied also to doors or other members which have to swing on trunnions.

One object of the invention is to apply a drag to the turning movement, so that the window will not swing freely. Objects which are achieved by the preferred constructions hereinafter described are the facility for locking the window at positions intermediate its fully open and fully closed positions, and the provision of an automatic lock at a preselected angular position of the window.

According to this invention, a pivot mounting for a window includes a hydraulic damper adapted to apply drag to the movement of the window on its pivot axis. Preferably the damper has a piston working in an enclosed cavity there being a restricted passageway to bypass the piston.

According to a preferred feature of the invention, the damper comprises a vane carried by a member movable with the window, so that the vane has an arcuate path of movement within an annular or part annular chamber, there being a partition member within the chamber dividing the chamber into two parts, one on each side of the vane, and a valve member adapted to control the flow of fluid through the partition member from one part of the chamber to the other. It is also preferred that the valve member is mounted for rotation within the partition member to bring ports into and out of register with ports in the partition member.

According to a further preferred feature of the invention, a member rotatable with the window is formed with a port so arranged as to co-operate with a port in the partition member, this arrangement providing for an automatic stop position when the port in the rotatable member is moved out of register with the port in the partition member.

The valve member may carry a baulking member which can be moved o either of two positions, in each of which it co-operates with a fixed stop to limit the movement of the valve member to one side or the other of a stop position, in which stop position the rotary member is locked against rotation.

Figure 1:
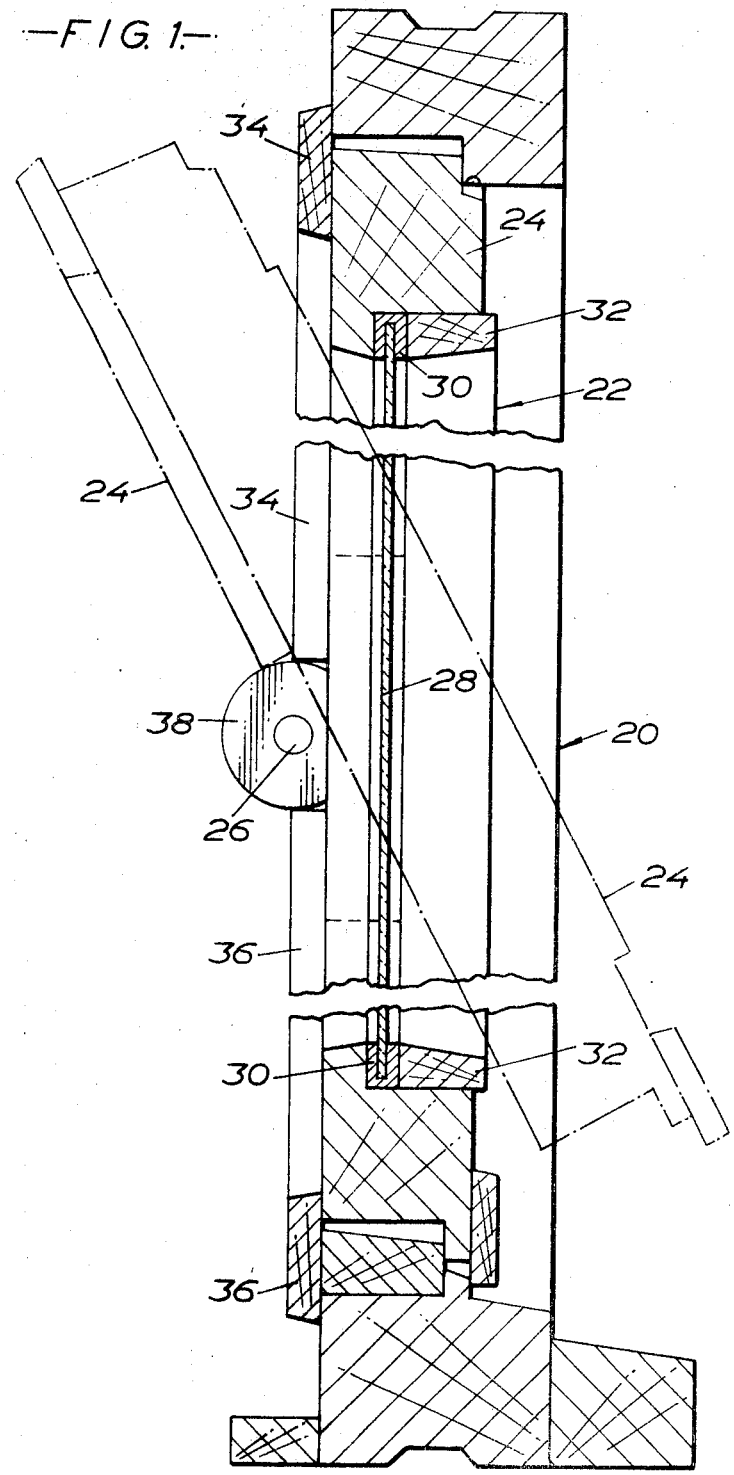
Figure 2:
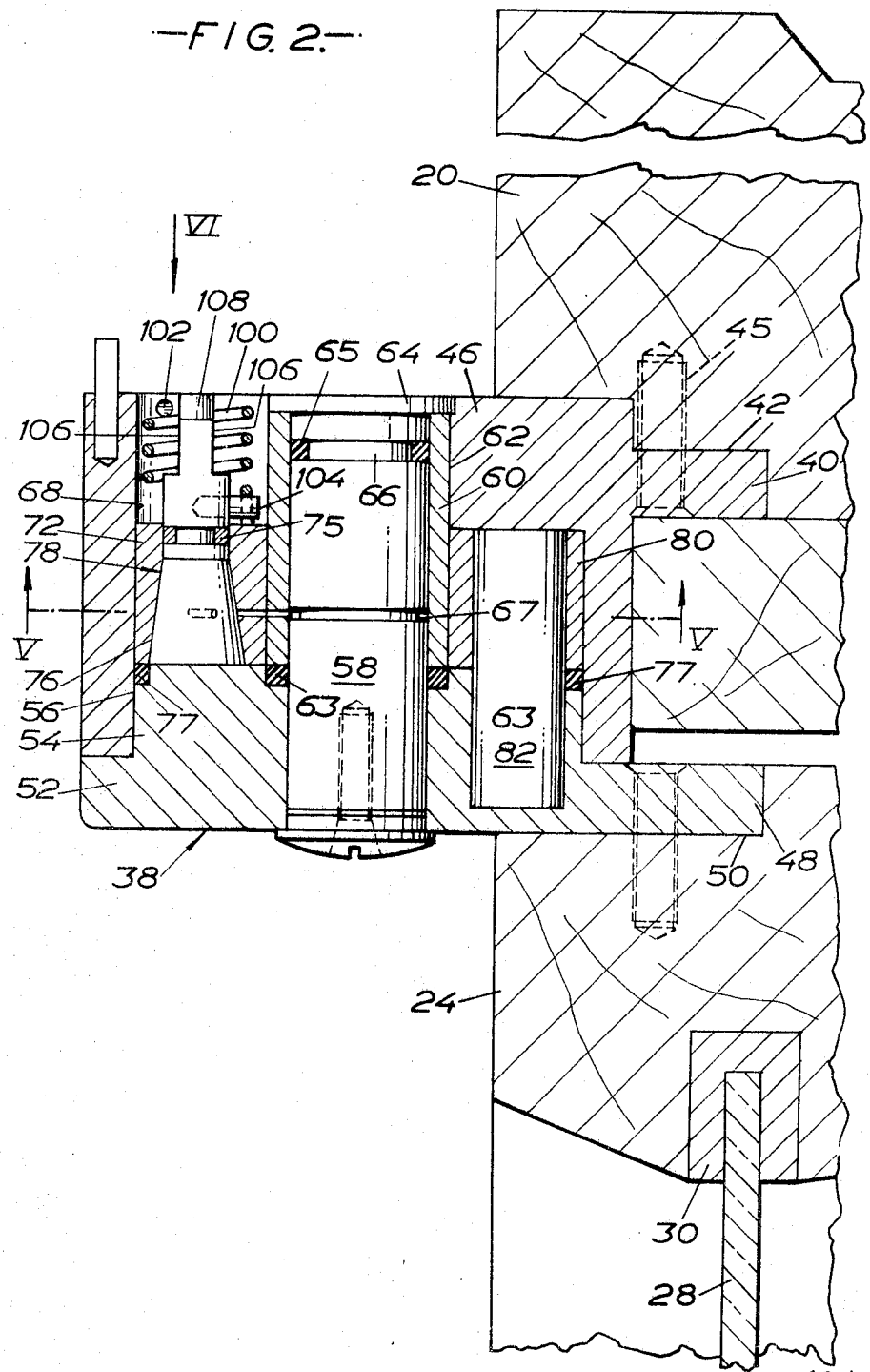
Figure 3:
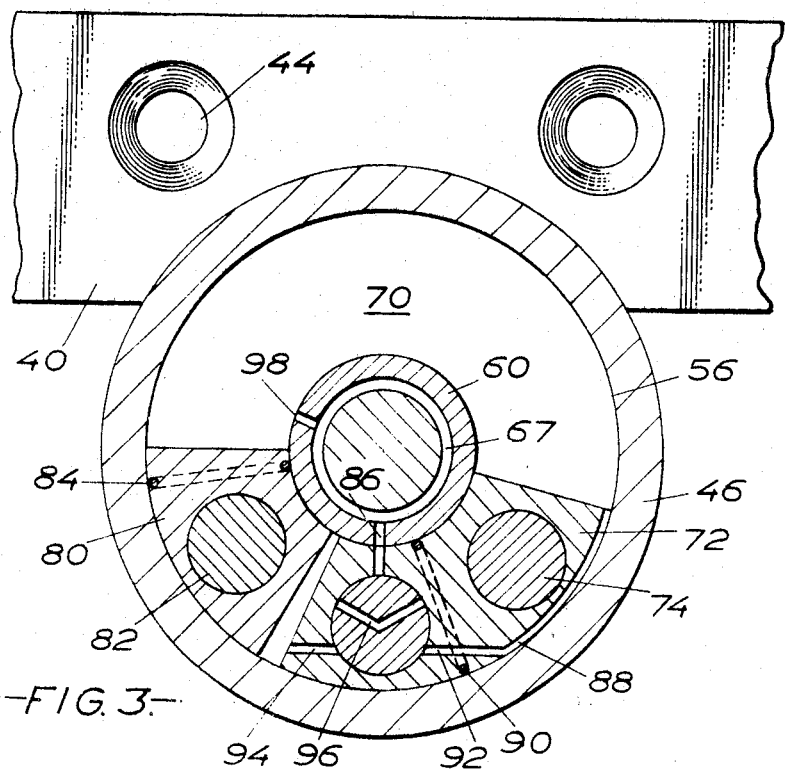
Figure 4:
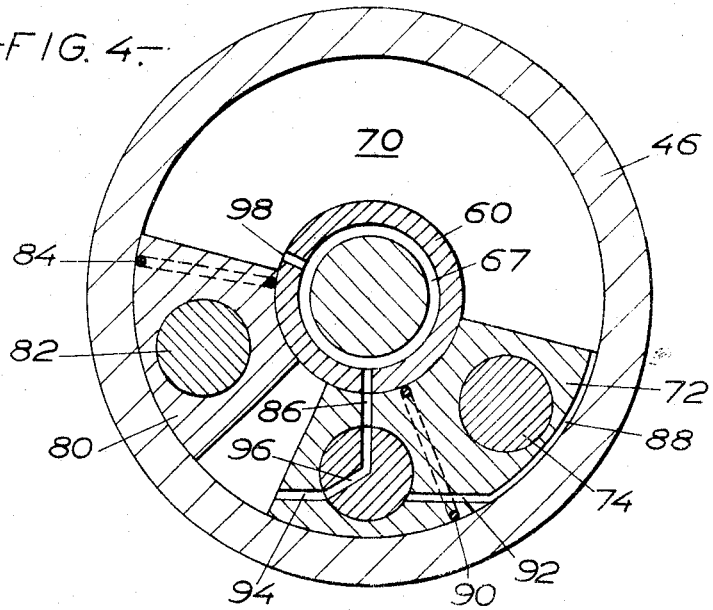

Two alternative constructions of window pivot mountings in accordance with the invention will now be described by way of examples only, with reference to the accompanying drawings, in which:

FIG. 1 is a vertical section through a window illustrating the method of opening, FIG. 2 is a horizontal section through part of the window shown in FIG. 1, but drawn to a larger scale to show details of a pivot mounting, FIG. 3 is a section on the line II—II in FIG. 5, showing a valve in the "locked" position, FIG. 4 is a view similar to FIG. 3; but showing the valve in the "normal" position, FIG. 5 is a view similar to FIG. 3, but showing the valve in the "release" position, FIG. 6 is a detail end view in the direction of arrow VI in FIG. 2, FIG. 7 is a perspecitve view of a key, FIG. 8 is a part sectional view of the key shown in FIG. 7, FIG. 9 is a view similar to FIG. 8, but showing a different key.

Figure 10:
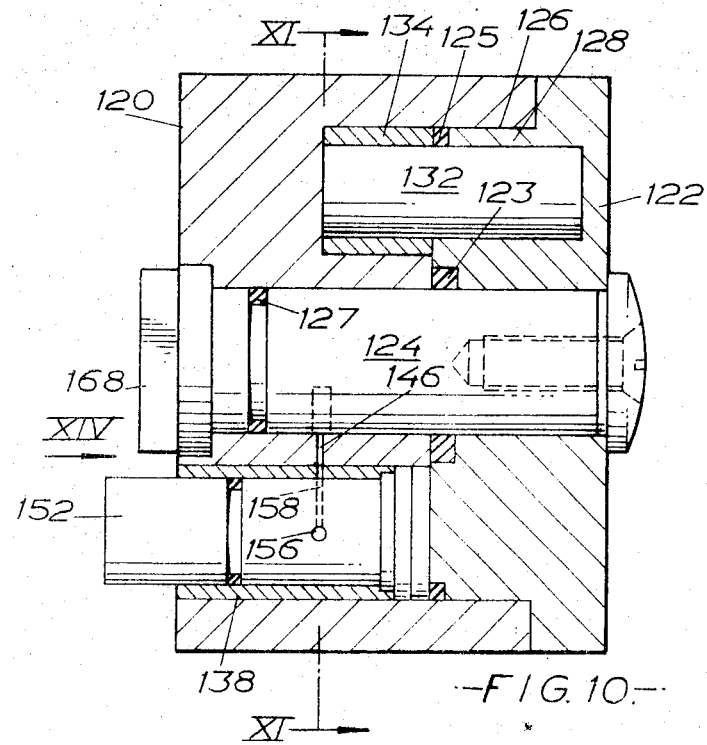
Figure 11:
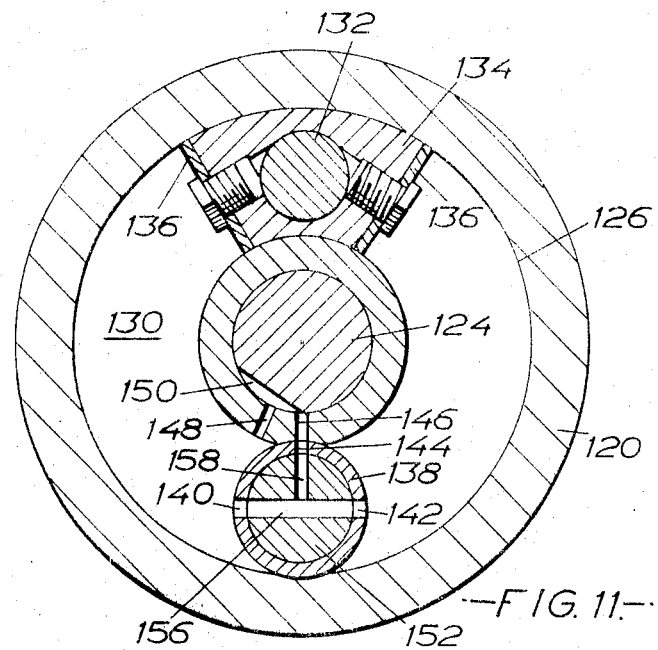

FIG. 10 is a sectional view similar to FIG. 2, but showing an alternative pivot mounting, FIG. 11 is a section on the line XI in FIG. 10, with a valve shown in the "release" position, FIG. 12 is a detail view of the valve in the "normal" position, FIG. 13 is a view similar to FIG. 12, but showing the valve in the "locked" position, FIG. 14 is a view in the direction of arrow XIV in FIG. 10, FIG. 15 is a section on the line XV—XV in FIG. 14, and FIG. 16 is a detail of a locking member.

Referring to FIG. 1, there is shown a window frame 20 which is fixed into the window opening in the conventional manner. As seen in this view, the outside of the building is to the right of the window. A window 22 has its own swinging frame 24 which fits into the fixed frame 20, and which can swing about an axis 26 on the inside. The window has the usual glass pane 28 held in place by seals 30 and retaining strips 32. A sealing frame 34 is fixed to the swinging frame, and extends across the top of the latter and down each side to a position near to the axis 26. Another sealing frame 36 extends across the bottom and up the sides of the swinging frame 24 to a position just below the axis 26, but this lower sealing frame is fixed to the frame 20. Therefore, when the window is opened, by turning the swinging frame 24 about the axis 26, the sealing frame 34 moves with the window, but the sealing frame 36 stays in position fixed to the frame 20. The gaps between the upper and lower sealing frames are filled by pivot mounting units, one of which, 38, can be seen in FIG. 1.

Each pivot mounting comprises two metal brackets fixed one to the swinging frame 24 and the other to the fixed frame 20. At one side of the window the bracket which is fixed to the swinging frame has a projecting trunnion shaft which extends into a plain bearing in a cylindrical housing carried by the bracket which is fixed to the fixed frame 20. This is such a well known arrangement that it need not be illustrated.

At the other side of the window, the special pivot mounting 38 which is the subject of the invention is fitted. A bracket 40 (see FIGS. 2 and 3) fits into a recess 42 in the fixed frame 20, there being holes 44 in this bracket for fixing screws 45. A cylindrical housing 46 (FIGS. 2, 3, 4 and 5) is fixed to or formed integral with the bracket 40, and this housing fits between the frames 20 and 24, but most of it projects on the inside of these frames (FIGS. 1 and 2).

A similar bracket 48 fits into a recess 50 in the swinging frame 24, and this bracket carries a substantially disc-like plate 52 which is of the same outside diameter as the housing 46, and which abuts against one end of that housing. A cylindrical boss 54 engages in a large bore 56 of the housing 46 and is free to rotate therein.

Fixed in the centre of the plate 52 is a steel shaft 58, which extends from the plate 52 into the housing 46, and is received in a sleeve 60 fitted in a small central bore 62 of the housing 46. It will be observed by reference to FIG. 2, that the large bore 56 only extends part way into the housing 46 from the plate end, and that the small bore 62 extends through the remainder of the width of the housing. The shaft 58 is aligned with the previously mentioned trunnion shaft, so that the rotary mounting of these shafts provides the axis 26 on which the swinging frame 24 can turn.

The sleeve 60 is located endwise by the boss 54 (which has a rubber or plastics sealing ring 63 engaging the end of the sleeve) and by a collar 64 formed on the end of the shaft 58. The sleeve must be a press fit in the bore 62 or made integral with the housing 46 so that it cannot rotate. Another sealing ring 65 is fitted in an annular recess 66 in the shaft 58, and there is an annular groove 67 in the shaft between the sealing rings 63 and 65.

A valve bore 68 is also formed in the housing 46 as far away as practicable from the bracket 40, and this bore also breaks through to the large bore 56. There is an annular space 70 defined cylindrically by the outside of the sleeve 60 and the bore 56, and defined endwise by the end wall of the bore 56 and the end of the boss 54. Within this annular space, there is a segmental valve block 72 which fills the cross-section of the space and is fixed in position by a pin 74 projecting from the housing 46.

Part of the block 72 extends behind the valve bore 68, and a hole 76 is formed in the block co-axial with the valve bore 68. Part of the hole 76 is tapered and part is parallel sided (FIG. 2). A valve member 78 has a part-conical portion which fits in the tapered part of the hole 76 and a cylindrical portion which projects out of the valve block 72 into the valve bore 68. Rubber or plastics sealing rings 75 and 77 are provided respectively between the member 78 and the valve body 72 and between the inner end of the boss 54 and the large bore 56 of the housing 46.

Also within the space 70 is a movable segmental vane 80 which will be referred to as the piston. The piston 80 also fills the cross-section of the space 70 and is locked by a peg 82 to the plate 52. Thus as the window is opened, and the frame 24 turns on its axis, the piston 80 sweeps round in the space 70. Obviously this limits the possible movement of the window, because the piston will be arrested by engagement with the ends of the valve block 72. The initial setting is such that when the window is closed, the piston is in the position shown in FIG. 3, where it is just clear of one end of the block 72. When the window has been turned through 180°, the upper frame 34 rests flat against the lower frame 36 and in this position the piston 80 is just clear of the other end of the valve block 72. A plastics O ring 84 fits in a groove extending all round the piston, and makes a liquid tight seal with the walls of the space 70.

When the pivot mounting is assembled, all the spaces within it are filled with hydraulic fluid (oil or grease) and this means that there is oil within the space 70 on both sides of the piston 80.

Certain hydraulic channels are formed in the mounting to provide for the control of the window opening. First there is a short passage 86 radially through the sleeve 60 and the valve block 72, this passage being aligned with the annular groove 67 in the shaft 58. Second, there is a circumferential groove 88 extending part way round the block 72, this groove being in the same radial plane as the groove 67. (An O ring 90 in a groove extending completely around the block 72, seals between that block and the housing 46). A chordal passage extends across part of the block 72, and has two branches which are (a) a branch 92 extending between the groove 88 and the bore 76, and (b) a branch 94 extending from the opposite side of the bore 76 to the end of the block opposite that at which the groove 88 starts.

The conical portion of the valve member 78 also has a cranked passage 96 in the same radial plane as the grooves 67 and 88 and the passages 86, 92 and 94. It will be observed from FIGS. 4 and 5, that the valve member can occupy a position where one arm of the passage 96 is in register with the passage 86 and the other arm is in register with the passage 94, or it can occupy a position where the two arms of the passage 96 register respectively with the two branches 92 and 94 of the chordal passage. Of course, the valve member can also be turned to a position such as that shown in FIG. 3, where the passage 96 is out of register with all the passages 86, 92 and 94. The position shown in FIG. 3 will be referred to as the "lock" position, that shown in FIG. 4 as the "normal" position, and that shown in FIG. 5 as the "release" position.

There is also a short radial passage 98 through the sleeve 60 at a position such that its outer end will be crossed by the sealing ring 84, when the piston 80 has moved through 22½° from the position it occupies when the window is closed.

The valve member 78 is urged into the "lock" position (FIG. 3) by a torsion spring 100 operative between a peg 102 fixed in the bore 68 and a peg 104 fixed to the valve member 78. The end of the valve member has two flats 106 (see FIGS. 2 and 6) and a short cylindrical portion 108 at its extremity. A peg 110 protrudes from the housing 46 near to the valve bore 68, and there is a part annular block 112 fixed in the bore 68 to engage the peg 104, to limit the possible rotation of the valve member. When the peg 104 is in the position shown in FIG. 6, the valve member is in the "locked" position, and when it is turned to bring the peg 104 into engagement with the other end of the block 112, it is in the "release" position.

For turning the valve member, two keys 114 (FIG. 8) and 116 (FIG. 9) are provided. Each key is constructed generally as indicated in FIG. 7 and comprises a head 118a or 118b and a lever 120a, 120b. The head has flats 122 for engagement on the flats 106 of the valve member, and a blind bore 124 to receive the portion 108 at the extremity of the valve member. When thus engaged, the key can be turned to rotate the valve member. It will be noted that the heads of the two keys are of different lengths, and these lengths are such that when the key 114 is used, its arm 120 will engage with the stop peg 110 and thus the movement of the key is restricted to that indicated in FIG. 6. When the valve member 78 is turned to the position where the key 114 engages with the peg 110, the valve member is in the "normal" position (FIG. 4). On the other hand, the head of the key 116 is long enough to permit its handle 120b to clear the end of the peg 110, and so when this key is used, the valve can be turned to the "release" position.

The two keys may be coloured differently or otherwise distinguished, because it is important that the "release" key 116 should not be improperly used.

Assuming that the window is closed, the valve member will be in the position shown in FIG. 3. The window is then locked, and cannot be opened, because the oil in the space 70 will not allow the piston 80 to move. There is no passage for this oil to flow from one side of the piston to the other.

If the key 114 is fitted and turned to the "normal" position, there is a path through the passage 98, groove 67 and passages 86, 96 and 94 from one side of the piston to the other. The piston can then move in the space 70 (allowing the window to open) although this movement will be braked by the restriction of the oil flow through the groove and passages. When the seal 84 of the piston passes over the end of the passage 98, there is again no passage from one side of the piston to the other, and the window is locked against further opening. Therefore the window cannot pass the 22½° open position if only the key 114 is used to unlock it.

When the window has to be fully opened (e.g. for cleaning the outside), the key 116 is fitted and turned to the "release" position. There is then a passage through the groove 88, and passages 92, 96 and 94, so that the piston 80 can make its complete traverse to the 180° open position. The pivot mounting is self locking due to the action of the spring 100 in any position between closed and fully open, and the valve can be rendered inoperative by removing the key 114 or 116.

In the alternative construction shown in FIGS. 10–16 there is a pivot mounting which is attached to the fixed and swinging frames in similar manner to that already described.

A housing 120 is fixed to the fixed frame 20 and an end plate 122 fixed to a bracket (not shown) which is attached to the swinging frame 24, closes the end of the housing in much the same manner as the plate 52 in the previous example. Part of the housing 120 is formed as a plain journal bearing for a trunnion shaft 124 carried by the plate 122.

An annular recess 126 is formed in the inside face of the housing 120, but this is closed on the inside by a boss 128 formed on the plate 122, so that there is an annular chamber 130 within the housing. This chamber has to be filled with hydraulic fluid and there are seals 123 and 125 one between the end of the cylindrical wall which surrounds the shaft and the boss 128, and another between the inside of the outer wall of the annular recess 126 and the outside cylindrical wall of the boss 128. A further seal 127 is arranged around the trunnion shaft 124 near to its outer end; the reason for this seal will become apparent later.

A peg 132 projects from the boss 128 into the annular chamber 130 and a wedge-shaped piston or vane 134 is fixed on to this peg. The vane has concentric arcuate inner and outer surfaces, which fit closely within the chamber walls. At each end face of the vane, there is an oil seal 136 so that the vane acts in the chamber as a piston.

A cylindrical partition member 138 is fixed in the housing and disposed parallel with the axis of the rotary shaft 124, but across the chamber. In fact, the wall of the partition cylinder is embedded in both the inner and outer walls of the annular chamber, so that it completely blocks the chamber and together with the vane 134, it divides the chamber into two parts. Three ports 140, 142 and 144 are formed in the wall of the partition member. The first two are comparatively large ports disposed opposite each other and leading one from each part of the chamber 130 into the bore of the partition member. The other is a small port leading from the inside of the partition member to a similar small port 146 through the inner wall of the chamber itself. The small port 144 in the partition member is disposed at 90° to the two large ports 140 and 142. A second small port 148 is formed in the inner wall of the chamber angularly spaced from the first small port in the same direction as the direction of rotation of the rotary shaft 124 when the window is opened.

A segmental slot 150 is formed in the rotary shaft in such a position that it can be aligned with the first and second small ports in the inner wall of the chamber, and the arrangement is such that when the window is closed, the slot registers with both the first and second small ports 146 and 148—thereby providing a passage between them—but after the window has been opened say 22½°, the shaft blanks off the first small port 146. The seal 127 on the shaft is, of course, on the outside of the slot 150.

Within the bore of the partition member there is a valve member 152, which takes the form of a rotary peg. This peg extends outside the housing, and an operating lever 154 is fixed on it. A large diametral port 156 extends across the valve member and a small port 158 is arranged radially at right angles to the large port. The axial disposition of these ports is such that they can be brought into register with the ports in the partition member.

The operating lever 154 has a wing 160 which is recessed on the inside at 162 (i.e. the side which faces the end face of the housing) and a locking member 172 has a rotary stub shaft 174 projecting through the wing into the recess. Within the recess, this stub shaft carries a half cylindrical baulking member 164. A peg 166 fixed to the housing extends into the centre of the recess 162 and engages with the inside of the baulking member 164. This peg therefore allows movement of the operating lever 154 from its position of rest to the position at which the peg engages the wall of the recess at one side of the recess. When the baulking member 164 is turned through 180° by rotation of the locking member 172, the operating lever is then permitted movement between the position where the peg engages with the other side of the recess and the position where it engages with the inside of the baulking member. The locking member 172 has two small projections 176 and 178 which engage with the peg 152 to limit the movement of the locking member (FIG. 16).

The middle position of the operating lever (as illustrated in FIG. 14) will be referred to as the "lock" position, one of the other extreme positions as the "normal" position and the other as the "release" position. For any one position of the locking member, the operating lever can be moved in only one direction. These movements each produce 45° movement of the valve member 152. The locking member may be provided with a special key to prevent unauthorised use.

When the window is closed, the small bore 158 of the valve member is aligned with the large bore 142 of the partition member, and the locking member 154 is in the normal position (FIG. 12). If the operating member is moved to the "lock" position, the small bore 158 is moved out of alignment with the large bore 142 of the partition member (FIG. 13). There is then no passage from that part of the chamber on the side into which the vane must move to permit window opening and therefore the window cannot be opened because the vane cannot move in that direction. If the locking lever is then moved to the lock position, the operating lever 154 is prevented from returning to the "normal" position and the window is locked until the operating lever is released and moved back to the "normal" position. This facility for locking the closed window is an important advantage of the invention.

When the valve is in the "normal" position and the window is opened, the vane moves in the chamber but it has to push the fluid displaced into the other part of the chamber. The path of the fluid is via the large port 142 in the partition member, the small port 158 in the valve member, one-half of the large port 156 in the valve member, the first port 146 in the inner wall of the chamber, the slot 150 in the rotary shaft and the second port 148 in the inner wall. Since the fluid has to pass through small ports it is restricted and this brakes the window movement. At any position, the operating lever can be turned into the "lock" position and locked by the locking lever and this will stop further movement of the window.

When the window arrives at the 22½° open position, its slot 150 moves away from the first port 146 in the inner wall and so blocks the fluid passage so that the window is arrested at this point. If it is required to open the window beyond this position, the locking lever is moved to the release position, and the operating lever can then be moved through a further 45° beyond the lock position, so that the large port 156 of its valve member is aligned with the two large ports 140 and 142 of the partition member. Fluid can then flow from one part of the chamber to the other straight through the large ports and this allows the window to open freely. But at any position, the valve member can be moved into the "lock" position to move its large portion 156 out of alignment with those of the partition member and the window is then locked against movement.

A cam 168 formed on the end of the rotary shaft is engageable with a nose 170 on the operating lever. During the first 22½° movement of the window away from the closed position, this cam prevents the operating lever being turned into the "release" position, so that this 22½° movement must be against the braking action of the mounting and the lock (caused by movement of the slot 150 away from the first small port 146) will always operate at the 22½° position.

During return movement from the fully open position, the cam 168 strikes the operating lever and turns it from the "released" to the "lock" position as the 22½° position is approached. This again locks the window and thereafter it can only be unlocked by putting the lever into the "normal" position which, of course, applies the brake.

I claim:

1. A pivot mounting for a swingable part of a building including a hydraulic damper, said damper comprising a housing defining an arcuate chamber subtending at least part of a circle, a vane within said chamber and carried by a member movable with said swingable part, a partition dividing said chamber into two parts one on each side of said vane, ports formed in said partition, and a ported valve member mounted for manually controlled movement within said partition to bring ports in said valve member into and out of register with ports in said partition to control flow of hydraulic through said partition from one part of said chamber to the other part of said chamber.

2. A pivot mounting as recited in claim 1, in which the valve member is mounted for rotation within the partition.

3. A pivot mounting as recited in claim 2, in which a member rotatable with said swingable part is formed with a port so arranged as to co-operate with a port in said partition member, this arrangement providing for an automatic stop position when said port in said rotatable member is moved out of register with the port in said partition member.

4. A pivot mounting as recited in claim 1, in which said valve member carries a baulking member which can be moved to either of two positions, in each of which it co-operates with a fixed stop to limit the movement of said valve member to one side or the other of a stop position, in which stop position said swingable part is locked against rotation.

5. A pivot mounting as recited in claim 1, in which said valve member is capable of opening either of two passages, one of which will be closed by the vane when the indow reaches a predetermined angular position.

References Cited

UNITED STATES PATENTS

| 1,176,014 | 3/1916 | Wyeth et al. | 16—54 |
| 2,361,551 | 10/1944 | Levyn | 16—128 XR |

FOREIGN PATENTS

| 814,532 | 2/1936 | France. |

BOBBY R. GAY, Primary Examiner

U.S. Cl. X.R.

16—54, 82; 70—89; 292—201